United States Patent
Drnek (10) Patent No.: US 10,661,720 B2
(45) Date of Patent: May 26, 2020

(54) ATTACHABLE HOLDER

(71) Applicant: Robert P Drnek, Linesville, PA (US)

(72) Inventor: Robert P Drnek, Linesville, PA (US)

( * ) Notice: Subject to any disclaimer, the term of this patent is extended or adjusted under 35 U.S.C. 154(b) by 8 days.

(21) Appl. No.: 16/013,769

(22) Filed: Jun. 20, 2018

(65) Prior Publication Data

US 2019/0389391 A1   Dec. 26, 2019

(51) Int. Cl.
| | |
|---|---|
| *B60R 9/00* | (2006.01) |
| *B65D 25/20* | (2006.01) |
| *B65D 43/16* | (2006.01) |
| *A01D 34/00* | (2006.01) |

(52) U.S. Cl.
CPC ............... *B60R 9/00* (2013.01); *B65D 25/20* (2013.01); *B65D 43/16* (2013.01); *A01D 34/001* (2013.01)

(58) Field of Classification Search
CPC .......... B60R 9/00; B65D 25/20; B65D 43/16; A01D 34/001
USPC ........................................................ 224/547
See application file for complete search history.

(56) References Cited

U.S. PATENT DOCUMENTS

| | | | | |
|---|---|---|---|---|
| 2,424,195 A | * | 7/1947 | Schwinn ............... | B62J 9/003 224/437 |
| 2,552,443 A | * | 5/1951 | Molinari ............... | A45C 3/045 224/601 |
| 2,635,797 A | * | 4/1953 | Siebert ............... | B62B 9/26 224/409 |
| 3,955,728 A | * | 5/1976 | Jackson ............... | B62J 9/003 224/417 |
| 3,955,730 A | * | 5/1976 | Montgomery ........... | B62J 9/003 224/438 |
| 4,542,839 A | * | 9/1985 | Levine ............... | B62J 7/06 224/417 |
| 4,598,846 A | * | 7/1986 | Schroeder ............... | B62J 9/003 224/420 |
| 5,199,619 A | * | 4/1993 | Mostashari ............... | B62J 7/06 224/431 |
| 5,282,554 A | * | 2/1994 | Thomas ............... | B62J 7/06 224/421 |
| 5,375,748 A | * | 12/1994 | Katz ............... | B62J 9/00 224/420 |
| 5,417,353 A | * | 5/1995 | Stall ............... | A01D 75/008 224/401 |
| 5,645,204 A | * | 7/1997 | Struzer ............... | B60R 11/00 224/547 |

(Continued)

*Primary Examiner* — Peter N Helvey
(74) *Attorney, Agent, or Firm* — Mark David Torche; Patwrite Law (57) ABSTRACT

An attachable holder has a holder portion with attachment openings in a base portion and a cover. The cover fits over the holder portion and is frictionally held in place. Attachment means such as cable ties or hook and loop straps is used to secure the attachable holder to a handle on a tool such as a weed trimmer, lawn mower etc. to hold safety glasses, ear protection, cell phones, etc. In one embodiment, the cover has retainer sockets or retainer slots in each end that releasably fit within retainer balls or retainer ridges found on the upper surface of the holder portion. In one embodiment, flexible clips and attachment wedges are used to secure the attachable holder to the handle. In another embodiment the cover is connected to the holder portion by an integrally formed hinge that allows the cover to close and open.

4 Claims, 14 Drawing Sheets

(56) References Cited

U.S. PATENT DOCUMENTS

| | | | | |
|---|---|---|---|---|
| 5,775,559 | A  * | 7/1998  | Mechanic | B62J 9/003 |
| | | | | 224/434 |
| 6,279,803 | B1 * | 8/2001  | Smerdon, Jr. | B62J 9/003 |
| | | | | 224/420 |
| 6,328,190 | B1 * | 12/2001 | Lohr | B62J 9/003 |
| | | | | 224/420 |
| D483,717  | S  * | 12/2003 | Groendyke | D12/409 |
| 7,077,302 | B2 * | 7/2006  | Chuang | B62J 11/00 |
| | | | | 224/271 |
| 7,128,341 | B1 * | 10/2006 | Dahl | B60R 9/00 |
| | | | | 280/769 |
| 7,275,669 | B1 * | 10/2007 | Aikens | B62J 9/003 |
| | | | | 206/315.9 |
| 2004/0094590 | A1 * | 5/2004  | Hollick | A63H 3/52 |
| | | | | 224/420 |
| 2012/0187169 | A1 * | 7/2012  | Osten | B62J 7/06 |
| | | | | 224/414 |
| 2013/0020362 | A1 * | 1/2013  | Luomanen | B62J 7/06 |
| | | | | 224/420 |

* cited by examiner

ATTACHABLE HOLDER

BACKGROUND OF THE INVENTION

Many useful tools used by modern people use a handle to operate the tool such as a lawn trimmer, lawn mower or snow blower etc. It is recommended to use safety glasses and ear protection with most of these tools. If the safety items are not readily available, often people will operate the tool without using them. Additionally, many people carry things such as cell phones or while operating these tools however, it is often inconvenient to carry these things.

There is a need for a easy to use, always available holder that is attachable to a tool with a handle that allows a user to store safety equipment or other items in the holder.

SUMMARY OF THE INVENTION

An attachable holder has a holder portion with attachment openings in a base portion and a cover. The cover fits over the holder portion and is frictionally held in place. Attachment means such as cable ties or hook and loop straps is used to secure the attachable holder to a handle on a tool such as a weed trimmer, lawn mower etc. to hold safety glasses, ear protection, cell phones, etc. In one embodiment, the cover has retainer sockets or retainer slots in each end that releasably fit within retainer balk or retainer ridges found on the upper surface of the holder portion. In one embodiment, flexible clips and attachment wedges are used to secure the attachable holder to the handle. In another embodiment the cover is connected to the holder portion by an integrally formed hinge that allows the cover to close and open.

Other features and advantages of the instant invention will become apparent from the following description of the invention which refers to the accompanying drawings.

DETAILED DESCRIPTION OF THE INVENTION

In the following detailed description of the invention, reference is made to the drawings in which reference numerals refer to like elements, and which are intended to show by way of illustration specific embodiments in which the invention may be practiced. It is understood that other embodiments may be utilized and that structural changes may be made without departing from the scope and spirit of the invention.

Figure 1:
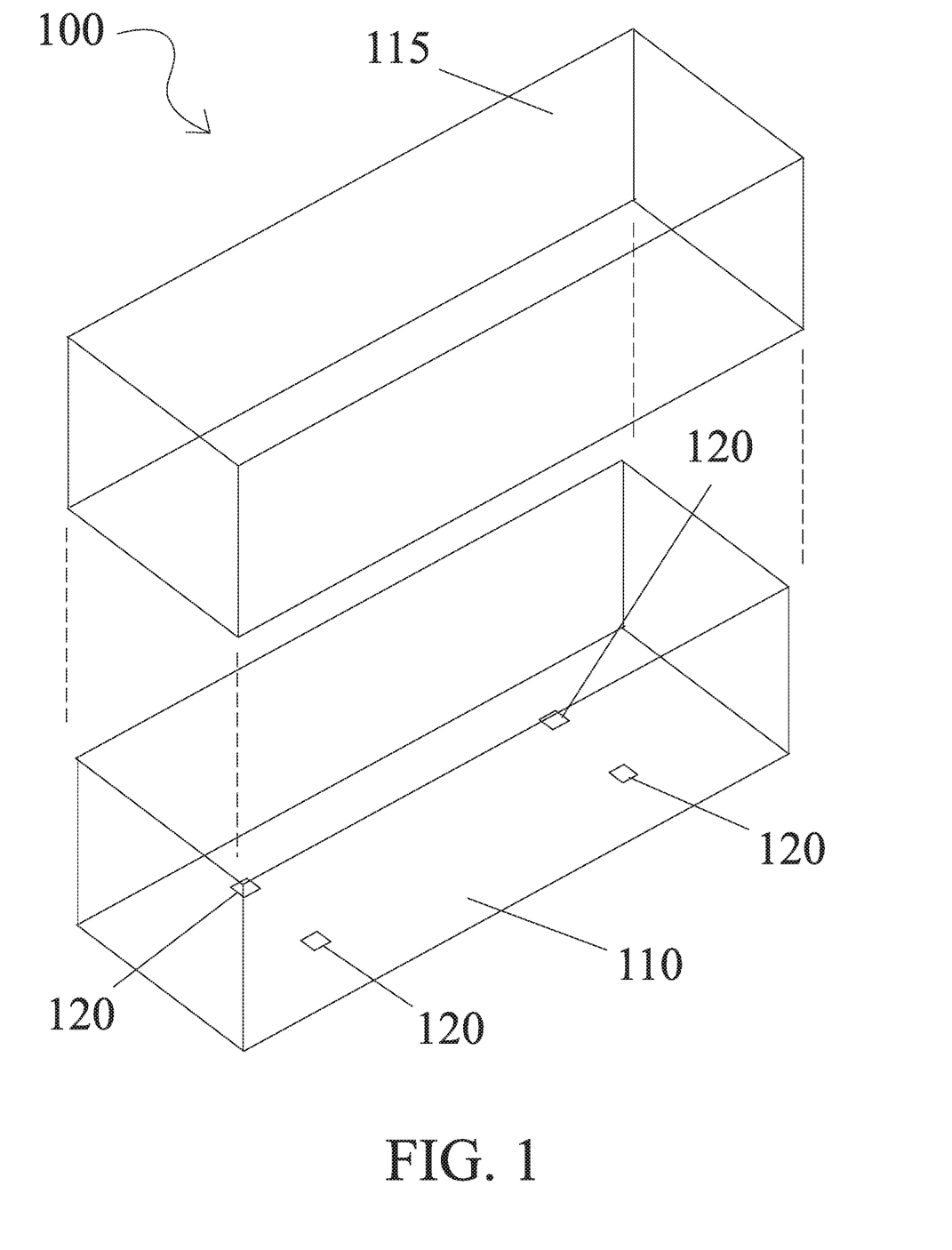
FIG. 1 a perspective view of an attachable holder according to an embodiment of the invention.
Figure 3:
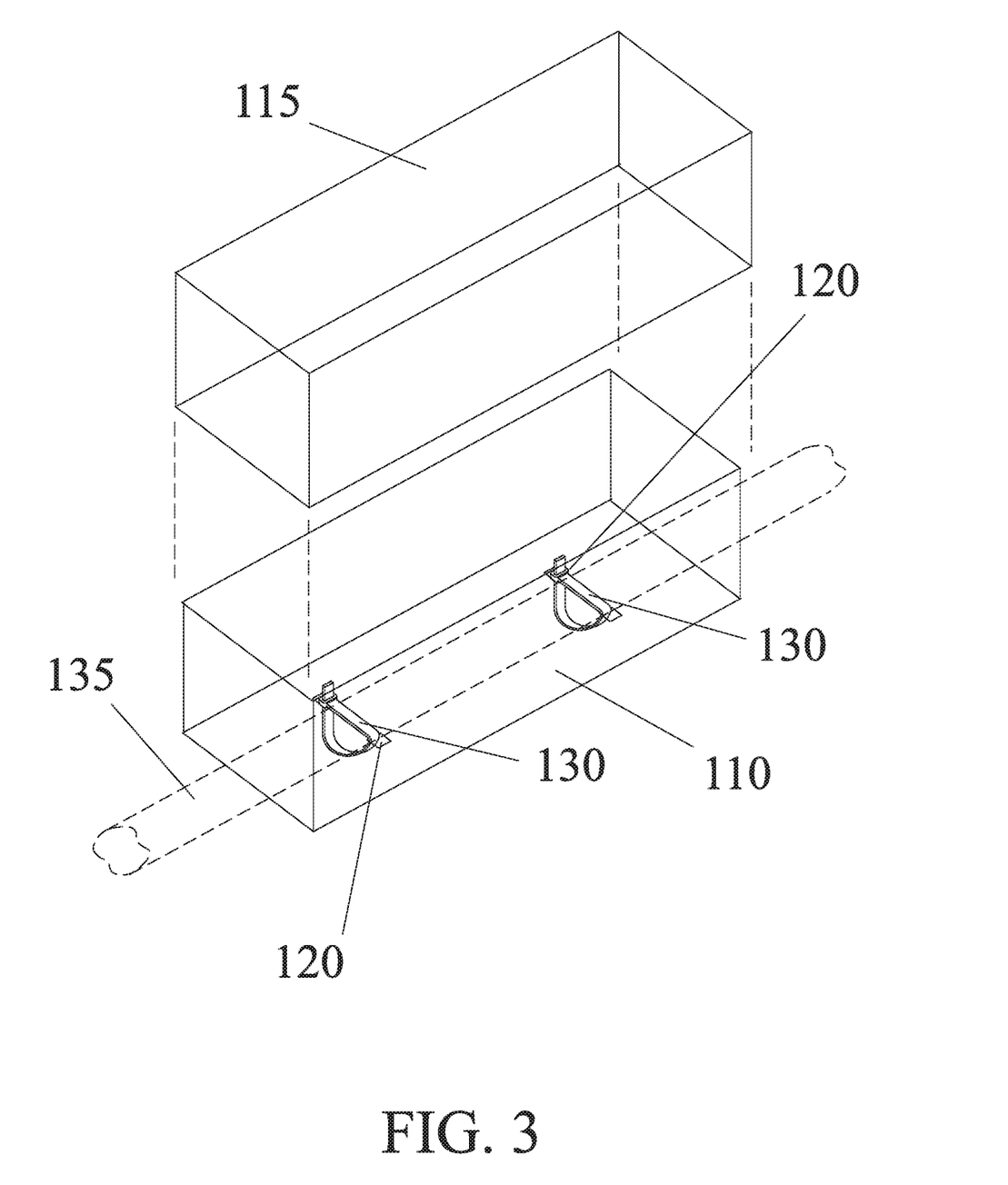
FIG. 3 is a perspective drawing showing the attachable holder shown in FIG. 1 attached to a handle.

Referring to FIGS. 1 and 3, an attachable holder 100 is shown having holder portion 110. Holder portion 110 has attachment openings 120. A cover 115 fits down over holder portion 110 to secure items placed within. When installing attachable holder 100 to a handle 135, attachment ties 130 are used. Attachment ties 130 are inserted in attachment openings 120 and around handle 135; then inserted in ratchet portion of attachment tie 130 and snugged as is known in the art. Cover 115 frictionally fits over holder portion 110 and stays in place by fitting snugly against holder portion 110.

Figure 2:
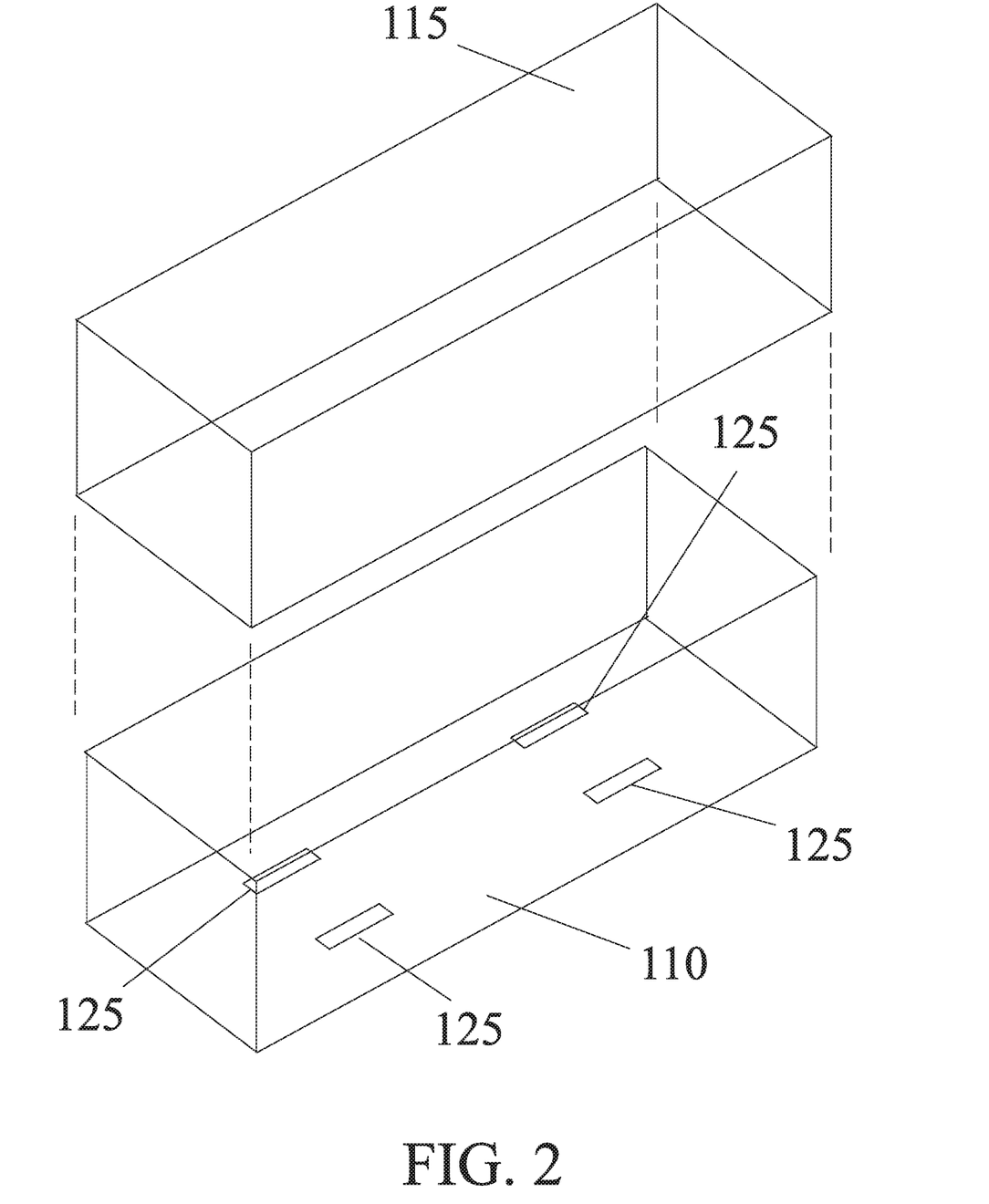
FIG. 2 is a perspective drawing of the attachable holder shown in FIG. 1 with an alternative attachment opening.
Figure 4:
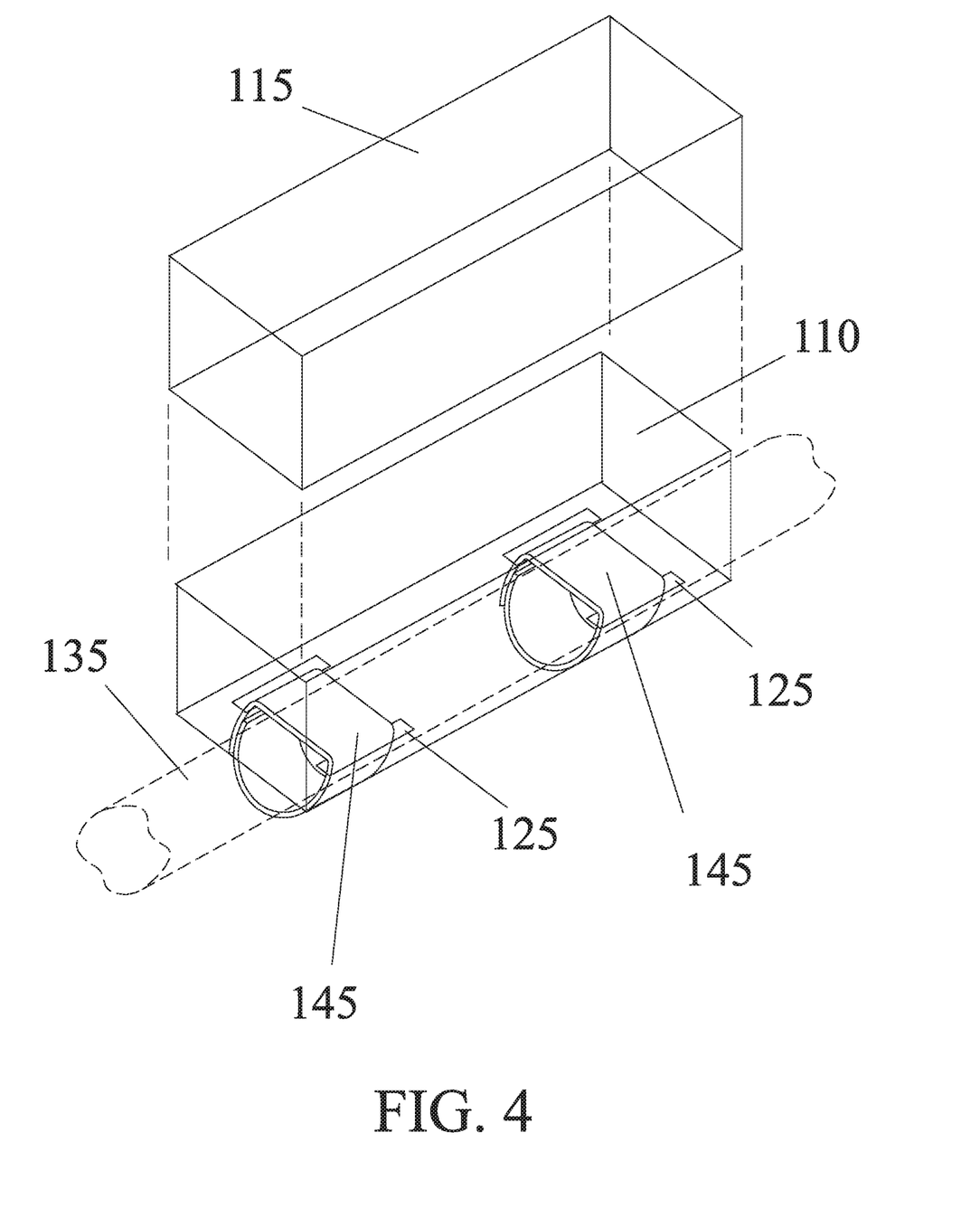
FIG. 4 is a perspective drawing showing the attachable holder shown in FIG. 2 attached to a handle.

Referring now to FIGS. 2 and 4, holder portion 110 has attachment slots 125 that allow attachment straps 145 to be inserted and wrap around handle 135. Attachment straps 145 are have a hook and loop portion to allow the user to removably attach them thereon.

Figure 5:
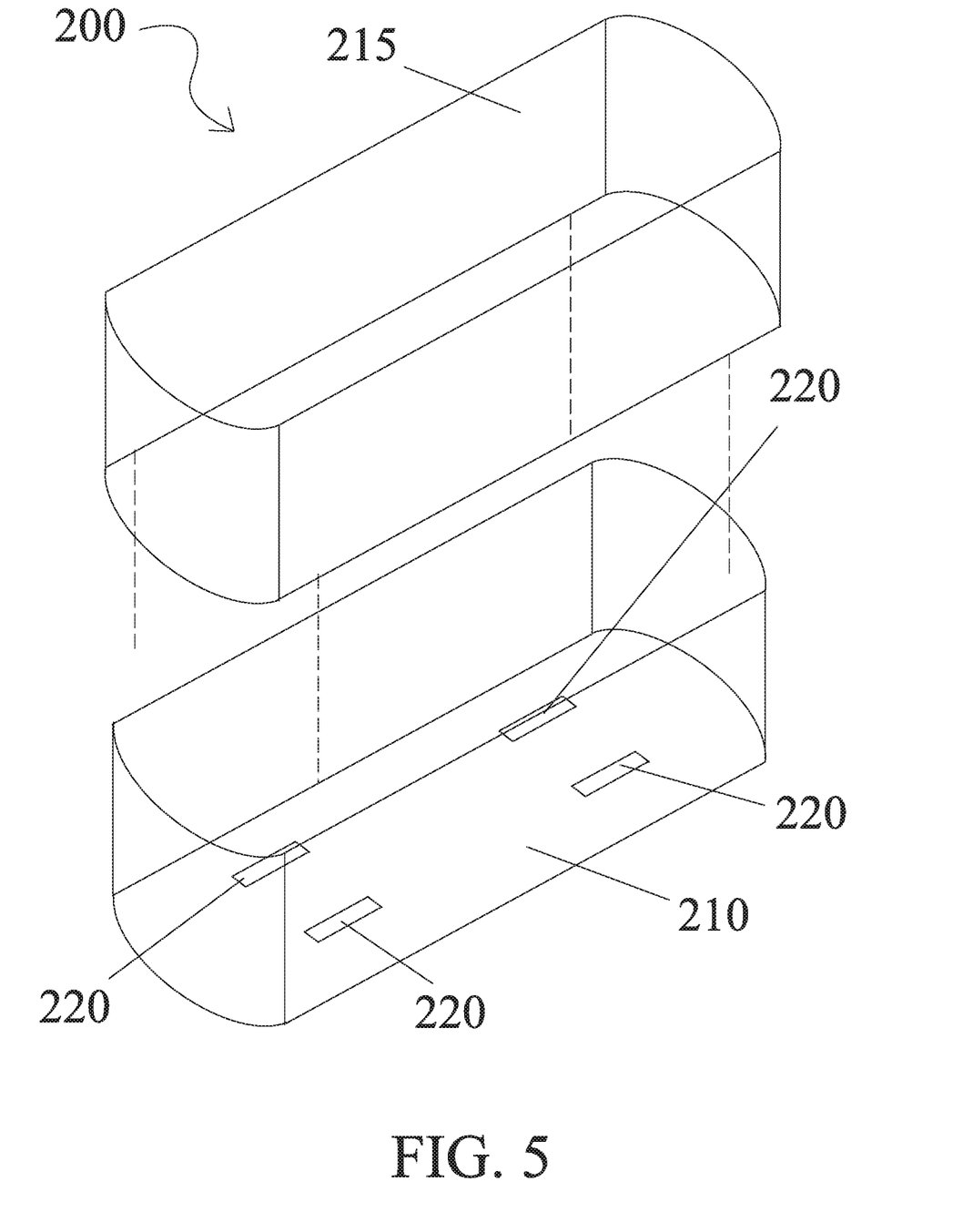
FIG. 5 is a perspective drawing of an attachable holder having an alternative shape according to an embodiment of the invention.
Figure 6:
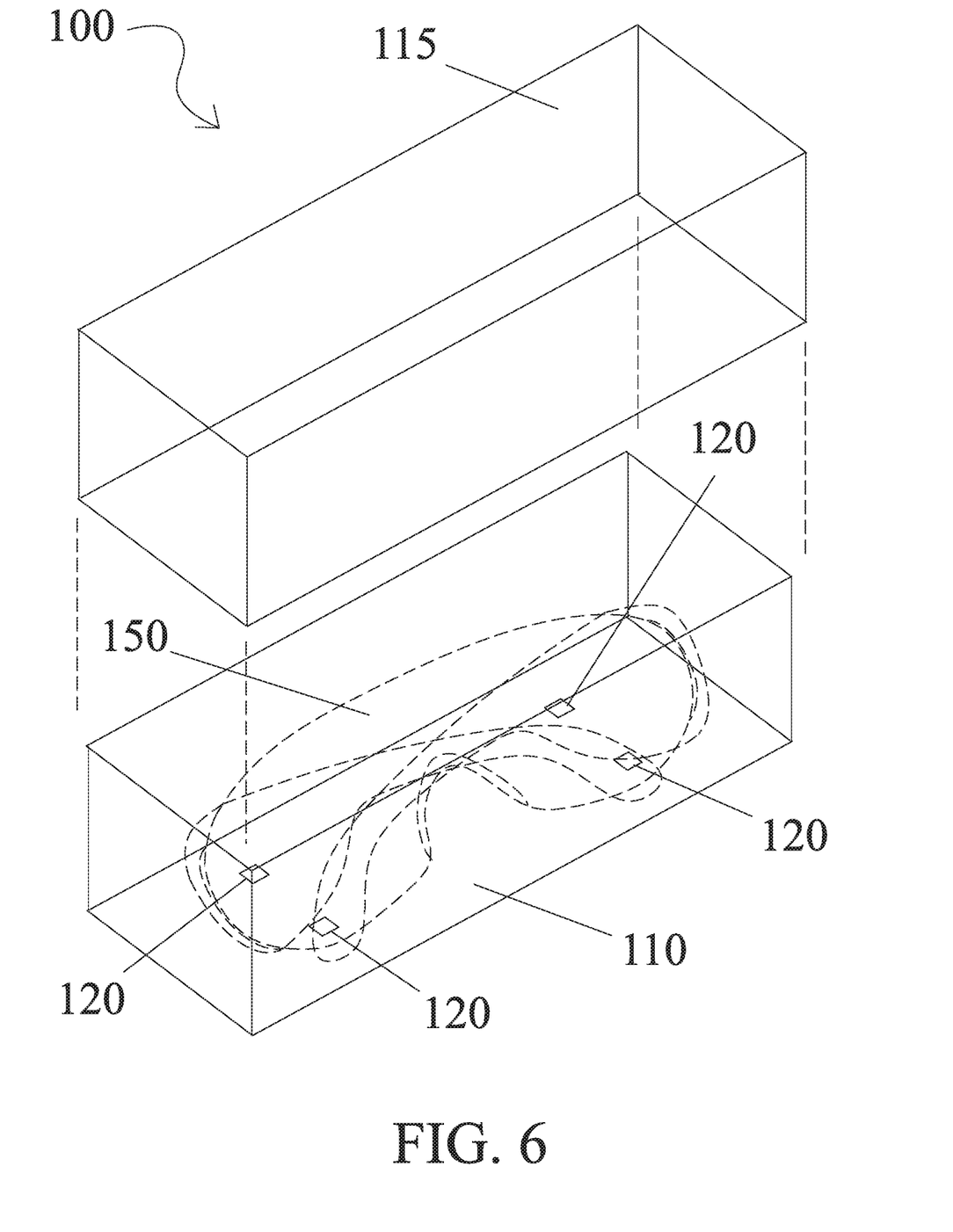
FIG. 6 is a perspective drawing of the attachable holder shown in FIG. 1 with a pair of safety glasses enclosed therein.
Figure 7:
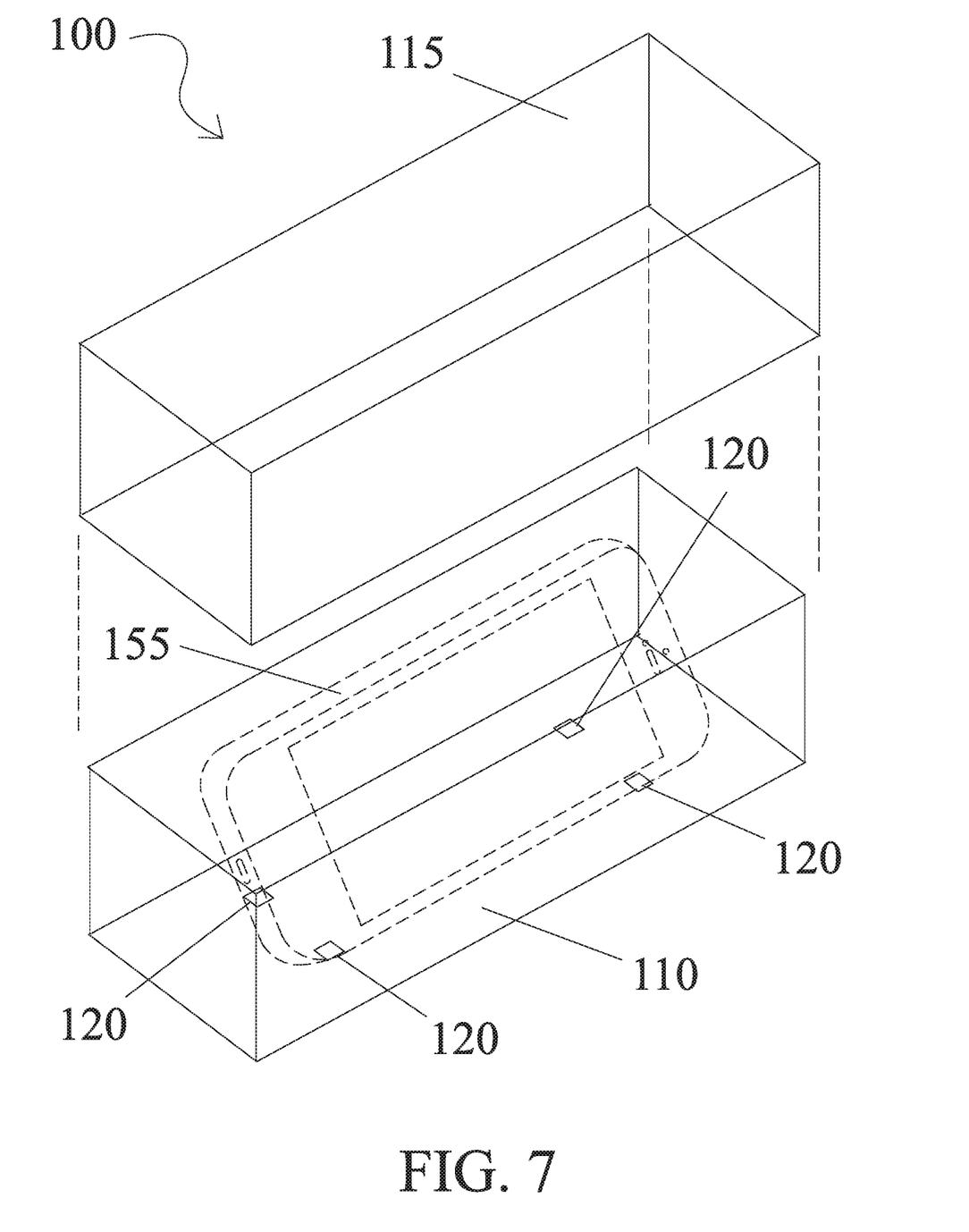
FIG. 7 is a perspective drawing of the attachable holder shown in FIG. 1 with a cell phone enclosed therein.

Now referring to FIG. 5, an attachable holder 200 is shown having a different shape than shown in FIGS. 1-4. A cover 215 frictionally fits over a holder portion 210. Holder portion 210 has attachment slots 220 in a bottom portion to allow the user to attach holder portion 210 to handle 135 as discussed above. Although attachable holder 200 is shown having rounded ends, it should be understood that attachable holder can have any geometry that allows a user to hold items within.

Figure 8:
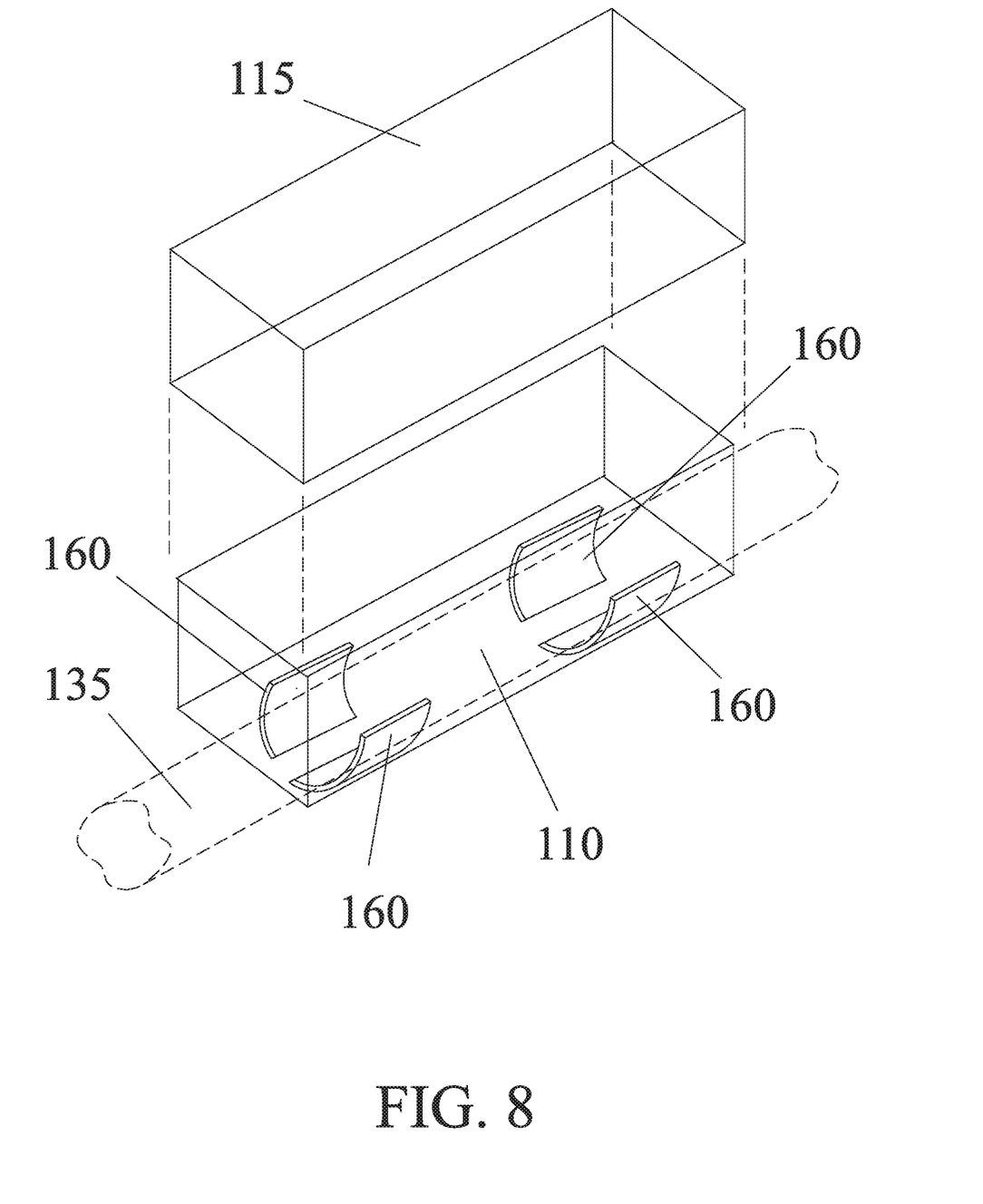
FIG. 8 is a perspective drawing of the attachable holder shown in FIG. 1 with an alternative attachment means.
Figure 9:
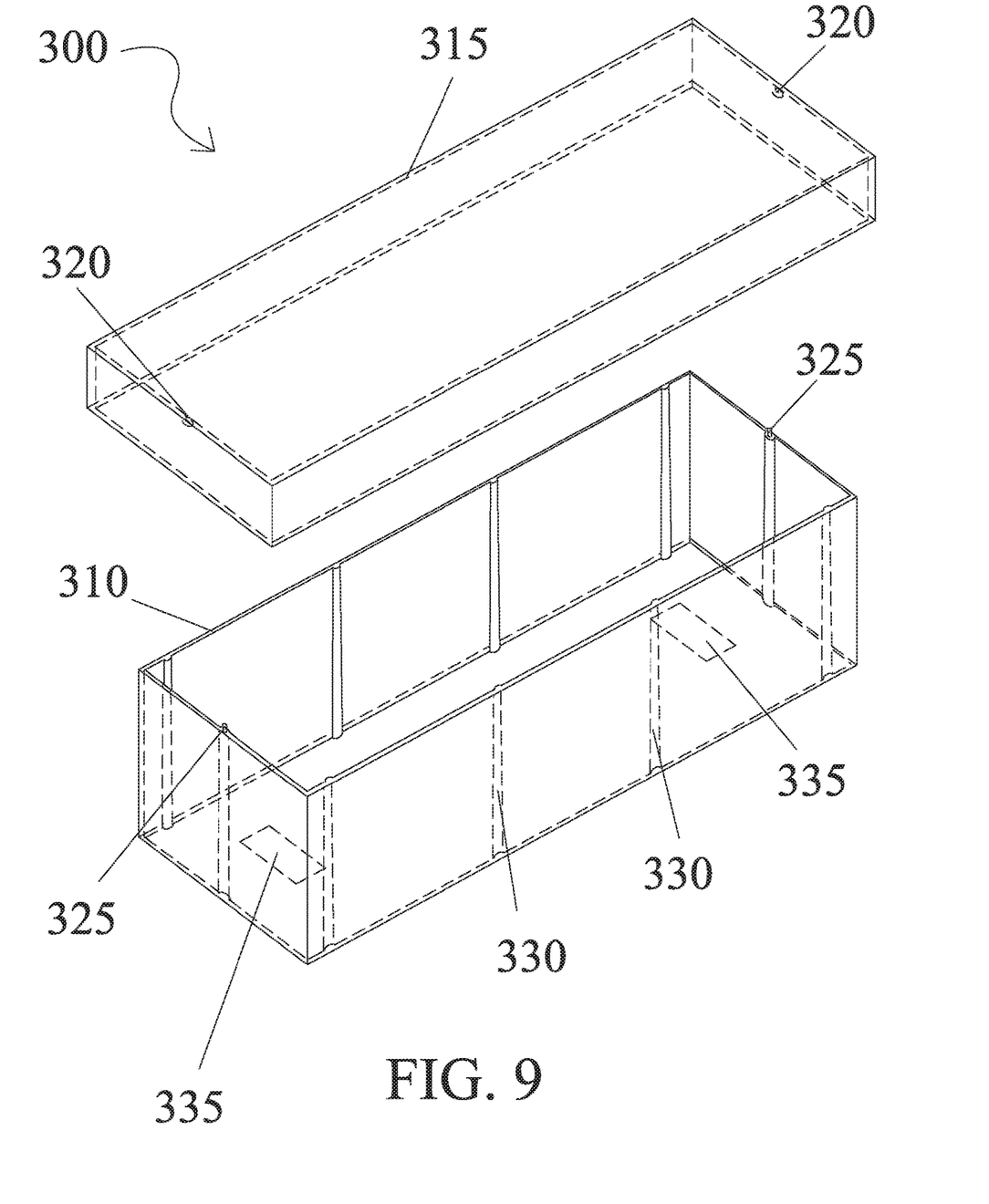
FIG. 9 is a perspective drawing of an attachable holder according to an embodiment of the invention.
Figure 10:
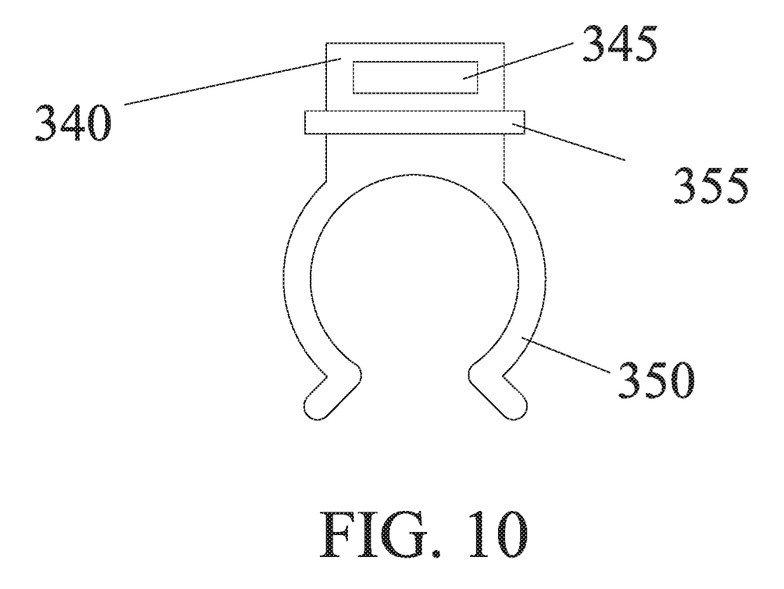
FIG. 10 is a side view of a clip used to attach the attachable holder shown in FIG. 9.
Figure 11:
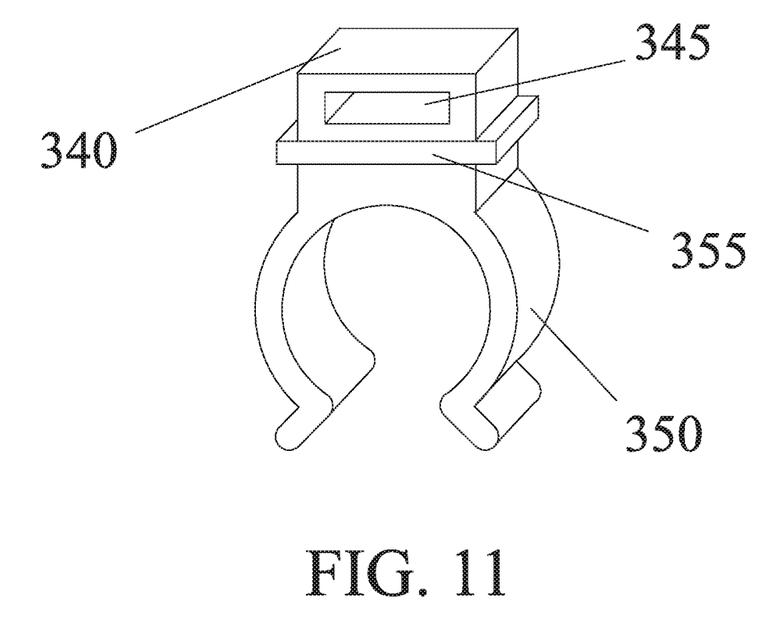
FIG. 11 is a perspective view of the clip shown in FIG. 10.
Figure 12:
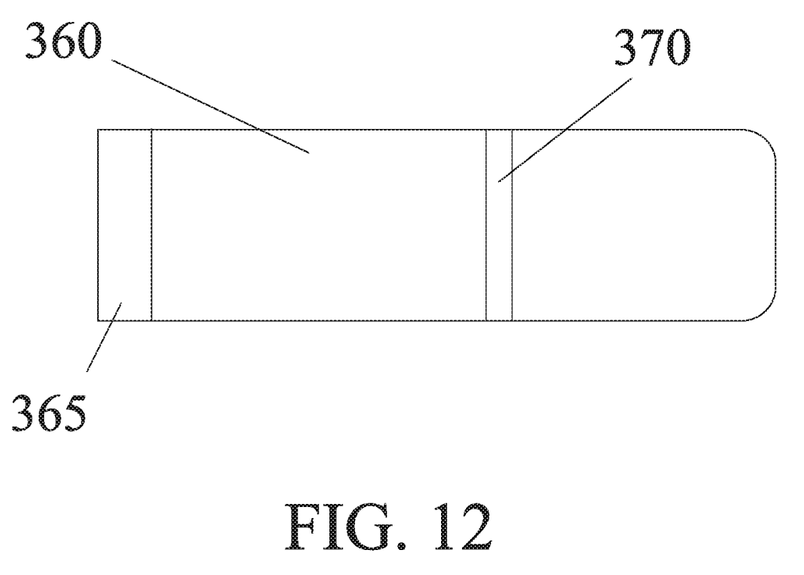
FIG. 12 is a top view of an attachment wedge used to removably attach the clip shown in FIG. 10.
Figure 13:
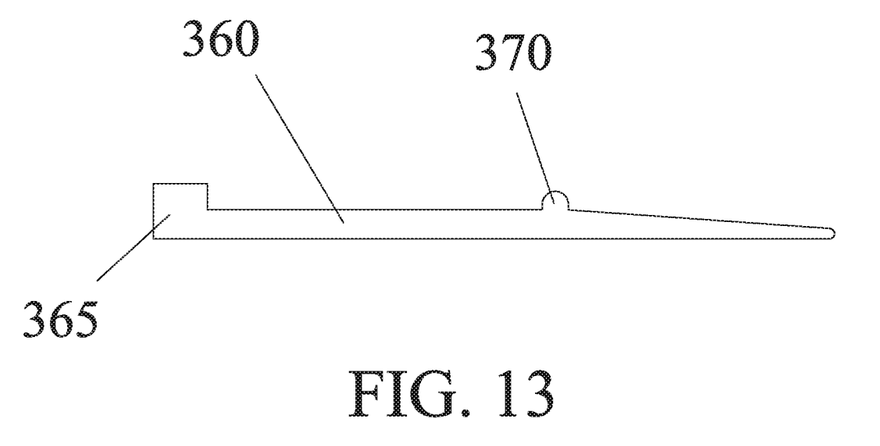
FIG. 13 is a side view of the attachment wedge shown in FIG. 12.
Figure 14:
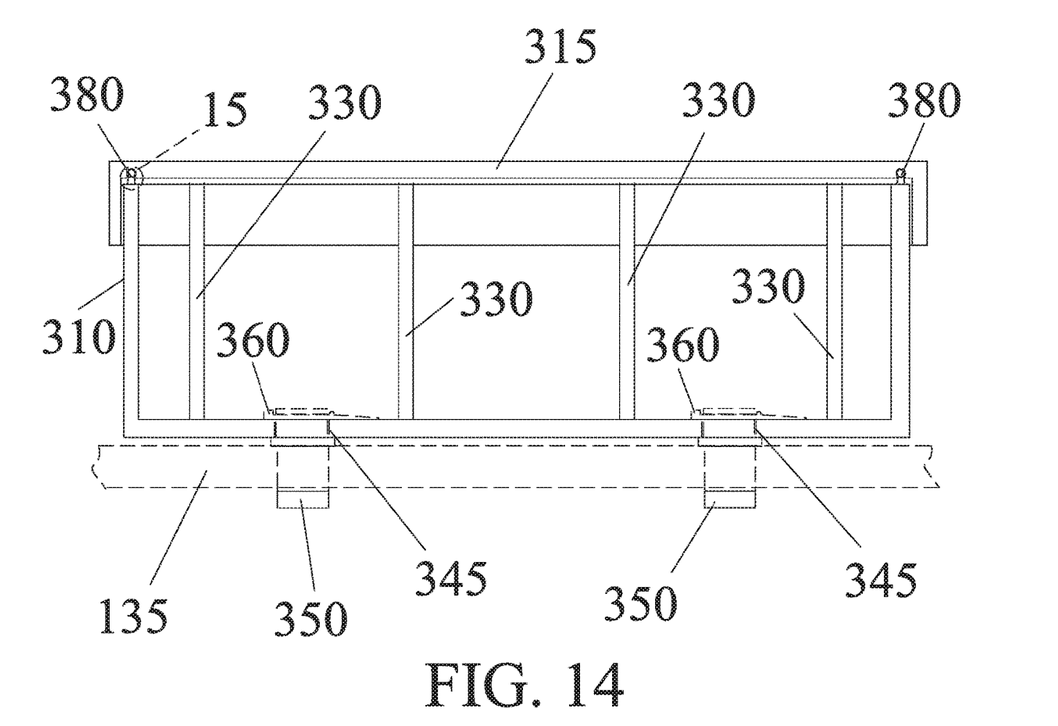
FIG. 14 is a cut-away side view of the attachable holder shown in FIG. 9 attached to a handle.
Figure 15:
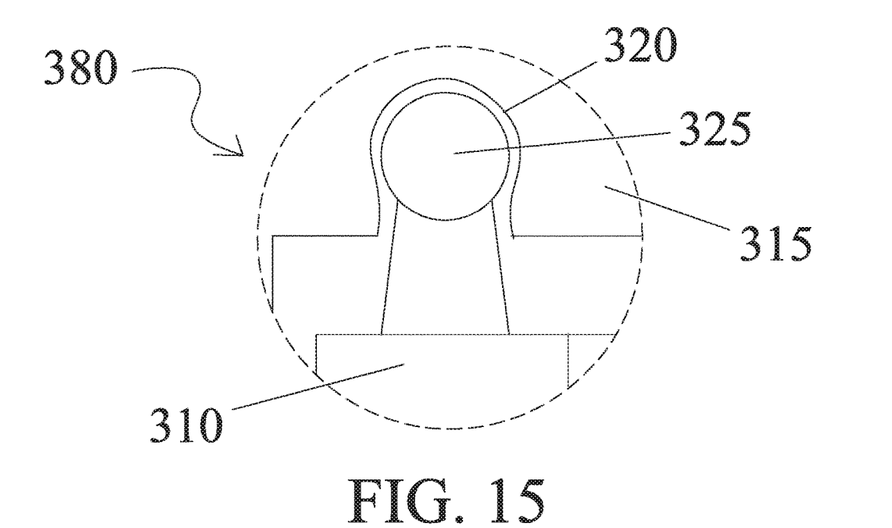
FIG. 15 is a detailed view of the portion shown in FIG. 14.

Referring to FIG. 8, attachable holder 100 is shown having alternative attachment means to allow the user to removably secure attachable holder 100 to handle 135. Split tube attachment portions 160 are used to flexibly fit over handle 135. Split tube attachment portion 160 may be molded as an integral part of holder portion 110 or may be attached as a separate piece. Of course other attachment means may be used such as, but not limited to, wire, glue or epoxy, etc. as long as it allows the user to attach holder portion 110 to handle 135.

Now referring to FIGS. 9-15, an attachable holder 300 is shown having a holder portion 310. Holder portion 310 has a plurality of ribs 330. Ribs 330 are used to stiffen holder portion 310. A cover 315 is used to cover and enclose items that are placed within. Cover 315 has a retainer socket that releasably fits over a retainer ball located on a holder portion 310. A pair of attachment openings 335 are disposed in a bottom portion of holder portion 310.

A pair of flexible clips 350 are provided to fit within attachment openings 335. To install attachable holder 300 to handle 135, flexible clip 350 is inserted within attachment opening 335 and an attachment wedge 360 is inserted in an attachment opening 335 to lock flexible clip 350 in place. Flexible clip 350 has a stop 345 that fits up against the bottom of attachment opening 335 to stop flexible clip 350 from passing through attachment opening 335. Attachment opening 335 is disposed in an attachment insert portion 340 of flexible clip 350. Attachment wedge 360 has a wedge stop 365 to keep attachment wedge 360 from pushing through attachment opening 345. Attachment wedge 360 also has a wedge bump 370 along an upper surface to help retain attachment wedge within attachment opening. The forward end of attachment wedge 360 is tapered to allow easy insertion in attachment opening 335.

To secure cover 315 to holder portion 310 a ball and socket retainer 380 is used to releasably hold cover 315 to holder portion 310. Ball and socket retainer 380 utilizes a retainer ball 325 is centrally disposed on both ends of holder portion 310. A matched retainer socket 320 is disposed on each end of cover 315. Ball and socket retainers 380 allow the user to push cover 315 on holder portion 310 with retainer ball 325 engaging retainer socket 320 to releasably secure cover 315. Of course cover 315 could have retainer balls 325 and holder portion 310 would then have retainer sockets 320. Additionally, although two ball and socket retainers 380 are shown, it should be clear than any number of ball and socket retainers 380 could be used to help hold cover even more securely.

Both covers and holder portions are made from plastic. Any suitable plastic may be used, such as but not limited to, polyethylene terephthalate (PET), High-Density Polyethylene (HDPE), Polyvinyl Chloride (PVC), Low-Density Polyethylene (LDPE) or Polypropylene (PP). Of course other materials may be used such as metal but would likely add to the cost of production. Additional, using plastic allows ball and socket retainer 380 to be formed without additional parts since the form can be directly molded rather than require additional parts.

Figure 16:
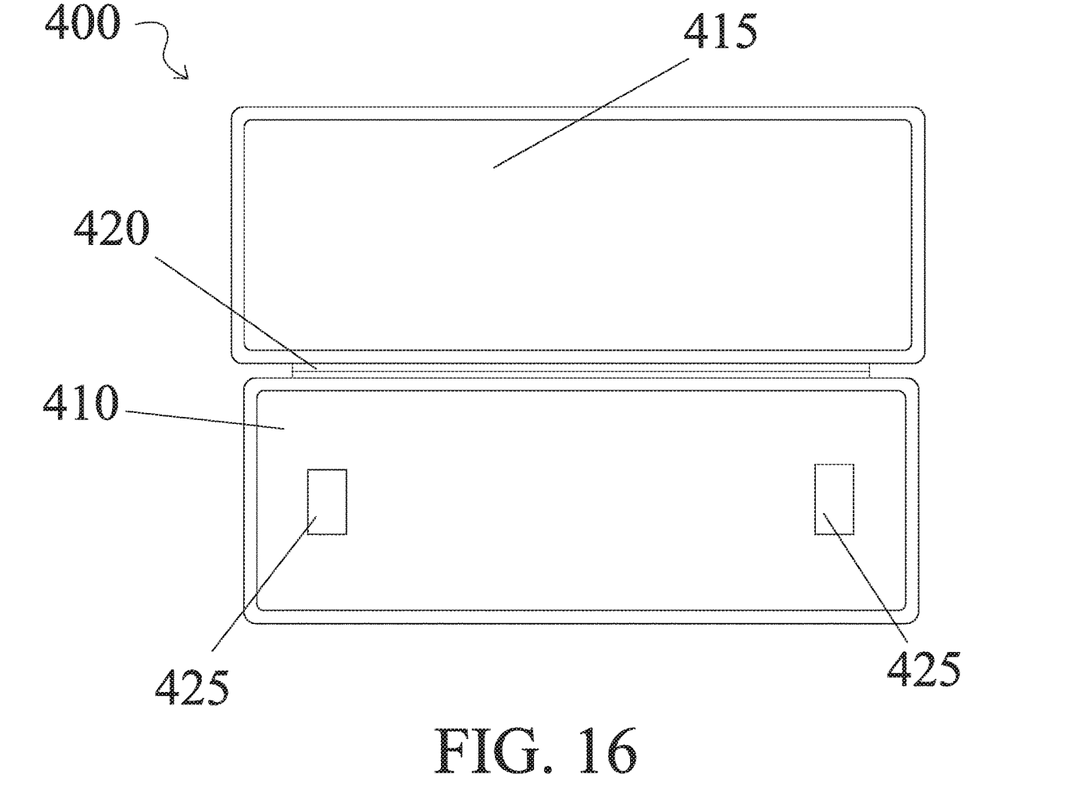
FIG. 16 is a top view of an attachable holder with a hinged cover according to an embodiment of the invention.
Figure 17:
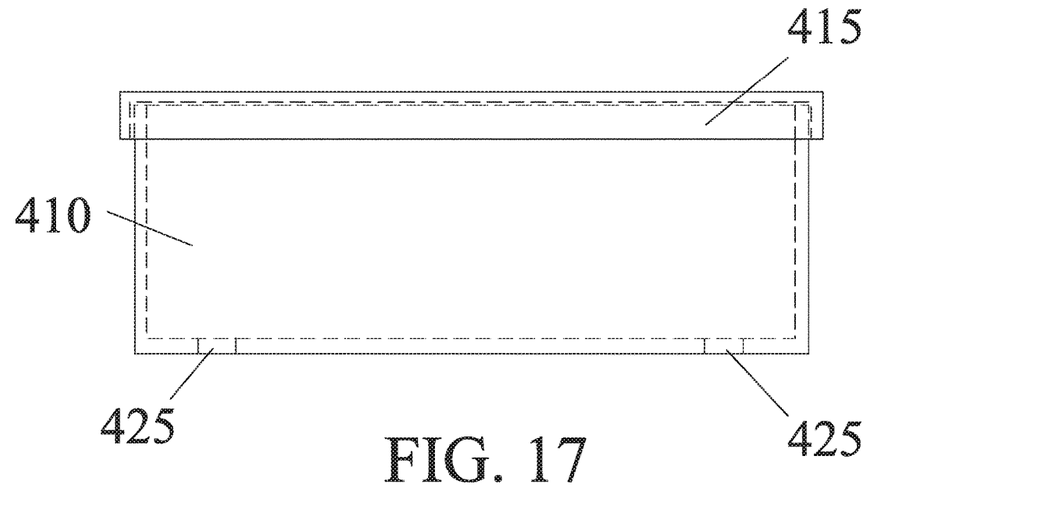
FIG. 17 is a side view of the attachable holder shown in FIG. with the cover closed.

Referring now to FIGS. 16 and 17, an attachable holder 400 is shown having a holder portion 410 and a cover 415. A hinge 420 is formed between cover 415 and holder portion 410 to allow cover 415 to stay connected to holder portion 410 while allowing access. A pair of openings 425 are used as discussed above to connect attachable holder 400 to handle 135. Cover 415 may be held in place by friction or a ball and socket retainer may be used as discussed above.

Figure 18:
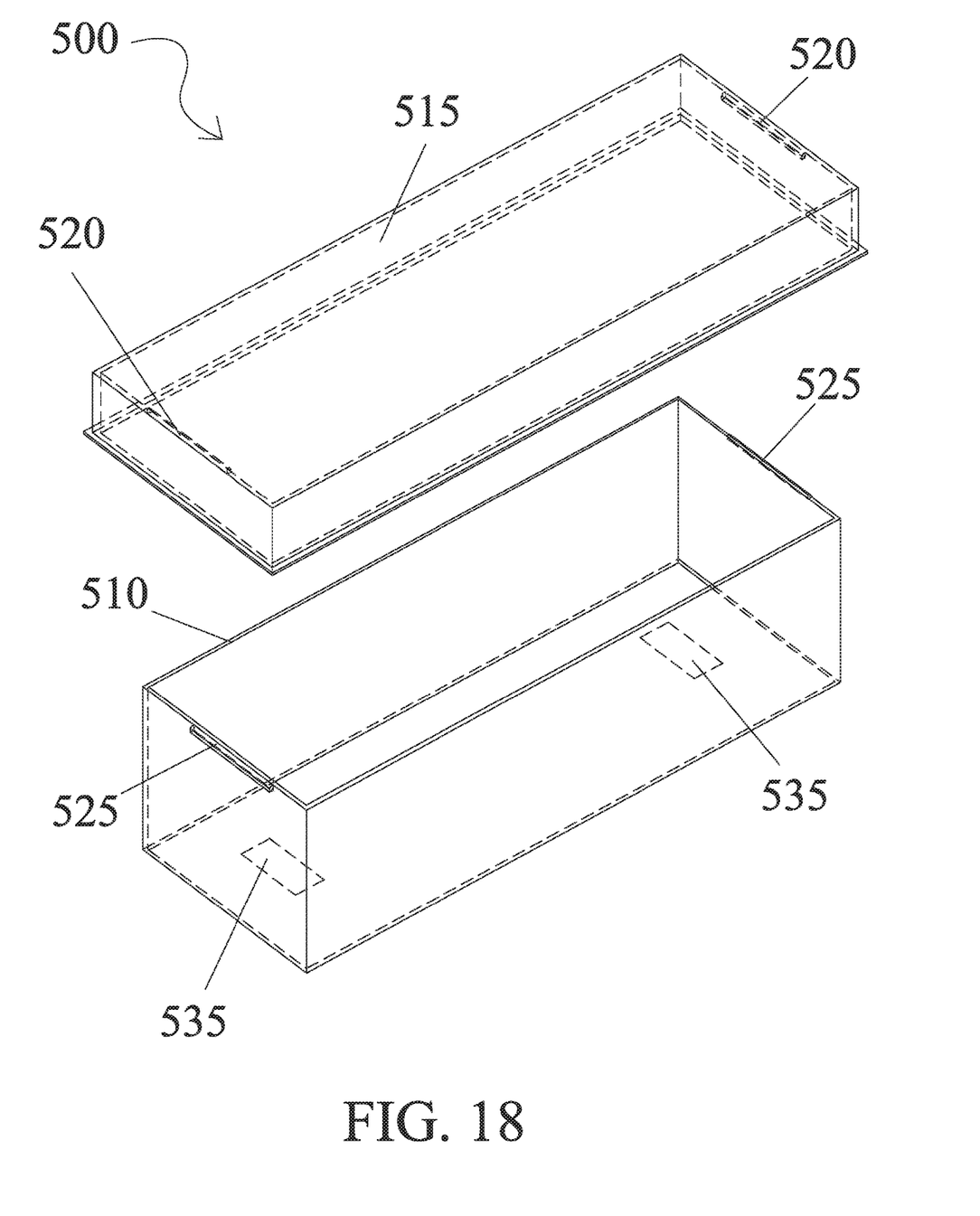
FIG. 18 is a perspective drawing of an attachable holder according to an embodiment of the invention.

Now referring to FIG. 18, an attachable holder 500 is shown having a cover 515 that fits over a holder portion 510. Cover 515 has a retainer slot 520 disposed on each end. Retainer slot 520 is an impression formed in cover 515 which forms an indentation along an inner portion of each end of cover 515. Holder portion has a matching retainer ridge 525 on an upper portion of each end. Retainer ridge 525 frictionally fits within retainer slot 520 to removably hold cover 515 on holder portion 510. Cover 515 deforms slightly when pressed over retainer ridge 525 until fitting within retainer slot 520. Again, cover 515 slightly deforms when a removing force is applied to force retainer ridge 525 out of retainer slot 520. Although retainer slot 520 is shown on cover 515 and retainer ridge 525 on holder portion 510, it should be understood that these positions could be reversed as long as they are made to removably fit together. Additionally, the actual position or number of slot-ridge portions is not essential as long as cover 515 is removably held on holder portion 510.

Although the instant invention has been described in relation to particular embodiments thereof, many other variations and modifications and other uses will become apparent to those skilled in the art.

What is claimed is:

1. An attachable holder for holding items therein comprising:
   a holder portion;
   said holder portion having at least one attachment opening in a base portion;
   a cover;
   said cover fitting over said holder portion;
   at least one flexible clip;
   said at least one flexible clip having an attachment insert portion wherein said attachment insert portion fits within said at least one attachment opening;
   said attachment insert portion having an opening therein;
   said at least one flexible clip having a stop below said attachment insert portion wherein said stop fits against said attachment opening;
   said at least one flexible clip has a split flexible tubular portion distally disposed from said attachment insert portion wherein a handle is resiliently held therein;
   at least one attachment wedge;
   said at least one attachment wedge having a tapered portion and a distally disposed wedge stop; and
   said at least one attachment wedge being removably inserted with said opening wherein said at least one flexible clip is secured within said holder portion.

2. The attachable holder for holding items according to claim 1 wherein said cover frictionally engages said holder portion wherein said cover is frictionally held in place.

3. The attachable holder for holding items according to claim 1 further comprising a hinge attached to said holder portion and said cover wherein said cover in hingedly closeable over said holder portion.

4. The attachable holder for holding items according to claim 3 wherein said holder portion, said cover and said hinge are integrally formed.

* * * * *